United States Patent
Zhang et al.

(10) Patent No.: US 9,304,554 B2
(45) Date of Patent: Apr. 5, 2016

(54) SIGNAL TRANSMISSION DEVICE

(71) Applicant: Wistron Corporation, New Taipei (TW)

(72) Inventors: Jary Zhang, New Taipei (TW); Shou-Lun Chang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 114 days.

(21) Appl. No.: 14/337,237

(22) Filed: Jul. 22, 2014

(65) Prior Publication Data

US 2015/0261263 A1 Sep. 17, 2015

(30) Foreign Application Priority Data

Mar. 12, 2014 (CN) .......................... 2014 1 0089772

(51) Int. Cl.
*G06F 1/16* (2006.01)
(52) U.S. Cl.
CPC ................ *G06F 1/1684* (2013.01); *G06F 1/16* (2013.01)
(58) Field of Classification Search
CPC ................................. G06F 1/16; G06F 1/1684
See application file for complete search history.

(56) References Cited

U.S. PATENT DOCUMENTS

| 8,267,704 B2* | 9/2012 | Cheng | H01R 13/60 439/131 |
| 8,767,387 B2* | 7/2014 | Knight | H01R 13/60 361/679.01 |
| 2010/0328870 A1* | 12/2010 | Nakamura | G06F 1/1616 361/679.4 |
| 2011/0075338 A1* | 3/2011 | Tang | G06F 1/1656 361/679.4 |
| 2012/0275103 A1* | 11/2012 | Lai | E05B 73/0082 361/679.4 |
| 2013/0088822 A1* | 4/2013 | Roesner | G06F 1/181 361/679.4 |

* cited by examiner

Primary Examiner — Lisa Lea Edmonds
(74) Attorney, Agent, or Firm — Winston Hsu; Scott Margo

(57) ABSTRACT

A signal transmission device disclosed in the present invention includes a casing, a first connector and a second connector. The connectors are disposed inside the casing. The first connector includes a first conductive terminal and a bridging component. The first conductive terminal is electrically connected to a socket of a first portable electronic device. The bridging component includes a conductive portion electrically connected to the first conductive terminal and a non-conductive portion. The second connector includes a conductive piece and a second conductive terminal. An end of the conductive piece contacts the conductive portion or the non-conductive portion according to position variation of the second connector. The second conductive terminal is electrically connected to the conductive piece, and can protrude from a hole on the casing when the conductive piece contacts the conductive portion, so as to insert into a socket of a second portable electronic device.

18 Claims, 13 Drawing Sheets

SIGNAL TRANSMISSION DEVICE

BACKGROUND OF THE INVENTION

1. Field of the Invention

The present invention relates to a signal transmission device, and more particularly, to a signal transmission device disposed on a portable electronic device to conveniently connect the foresaid portable electronic device to another portable electronic device.

2. Description of the Prior Art

With the advanced technology, the smart phone not only can be utilized to communicate by voice call and to receive/transmit the text message, but also can install lots of application programs for entertainment. A built-in battery of the smart phone may be easily depleted since the high energy consumption application program is operated, such as transmitting file and playing games or videos, and a portable battery charger or a backup battery might be the essential equipment. A conventional battery charger is a soft cable, which is detachable with the smart phone. The detachable battery charger may be lost so that the smart phone cannot be charged or cannot transmit/receive the file. Therefore, development of an assembly design involved with the battery charger and the mobile phone to provide advantages of preferred aesthetic and convenient operation is an important of the mobile phone industry.

SUMMARY OF THE INVENTION

The present invention provides a signal transmission device disposed on a portable electronic device to conveniently connect the foresaid portable electronic device to another portable electronic device for solving above drawbacks.

According to the claimed invention, a signal transmission device capable of electrically connecting a first portable electronic device to a second portable electronic device is disclosed. The signal transmission device includes a casing, a first connector and a second connector. The casing is utilized to accommodate the first portable electronic device. A hole is formed on the casing. The first connector is disposed inside the casing. The first connector includes a first conductive terminal and a bridging component. The first conductive terminal is electrically connected to a socket of the first portable electronic device. The bridging component has a conductive portion and a non-conductive portion, and the bridging component is electrically connected to the first conductive terminal via the conductive portion. The second connector is movably disposed on the casing. The second connector includes a conductive piece and a second conductive terminal. An end of the conductive piece is switched to contact the conductive portion and to contact the non-conductive portion according to movement of the second connector. The second conductive terminal is electrically connected to the other end of the conductive piece. The second conductive terminal is adapted to protrude from the hole since the conductive piece contacts the conductive portion, so as to insert the second conductive terminal into the socket of a second portable electronic device.

According to the claimed invention, the second conductive terminal is located inside the hole since the conductive piece contacts the non-conductive portion.

According to the claimed invention, the casing includes a slide track structure, and the second connector further comprises a body. The conductive piece and the second conductive terminal are disposed on the body. The body utilizes the slide track structure to move relative to the casing.

According to the claimed invention, the casing further includes a first opening structure. The signal transmission device further includes a pushing component disposed on the body and slidably located inside the first opening structure.

According to the claimed invention, the casing further includes a first stopper and a second stopper respectively disposed on opposite sides of the first opening structure.

According to the claimed invention, the signal transmission device further includes a resilient component. Two ends of the resilient component are respectively connected to the casing and the body.

According to the claimed invention, the casing further includes a second opening structure connected to the first opening structure. The body includes a deforming portion whereon the pushing component is disposed. The signal transmission device further includes a constraining component slidably disposed between the first opening structure and the second opening structure.

According to the claimed invention, the constraining component is located on the first opening structure to contact against the pushing component.

According to the claimed invention, the constraining component is located on the second opening structure, and the pushing component can be adapted to move from an end of the first opening structure to the other end of the first opening structure.

According to the claimed invention, position variation of the pushing component is substantially greater than a structural height of the constraining component since the deforming portion is deformed.

According to the claimed invention, the signal transmission device further includes a recovering component. Two ends of the recovering component are respectively connected to the casing and the constraining component.

According to the claimed invention, the signal transmission device further includes a rotating component rotatably disposed by the first opening structure. A protruding portion of the rotating component is adapted to move into the first opening structure to contact against the pushing component.

According to the claimed invention, the rotating component rotates relative to the casing to move the protruding portion into or out of the first opening structure.

According to the claimed invention, the signal transmission device further includes a torsional component disposed between the rotating component and the casing.

According to the claimed invention, the signal transmission device further includes an actuating component slidably disposed inside the casing. The actuating component is adapted to insert into a sunken structure of the body to constrain movement of the body relative to the casing.

According to the claimed invention, the signal transmission device further includes an inclined guiding structure disposed on an end of the actuating component. The inclined guiding structure slidably contacts the body to move the actuating component relative to the casing.

According to the claimed invention, the signal transmission device further includes a first elastic component and a second elastic component. Two ends of the first elastic component are respectively connected to the body and the casing. Two ends of the second elastic component are respectively connected to the actuating component and the casing.

The present invention assembles the energy charge/data transmission mechanism with the protective shell, and the protective shell can be detachably disposed on the portable electronic device for operational convenience. The signal transmission device of the present invention has advantages of simple structure and easy operation, operation modes of the signal transmission device can be rapidly switched by position variation of the pushing component, and the signal transmission device is suitable of any kinds of portable electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
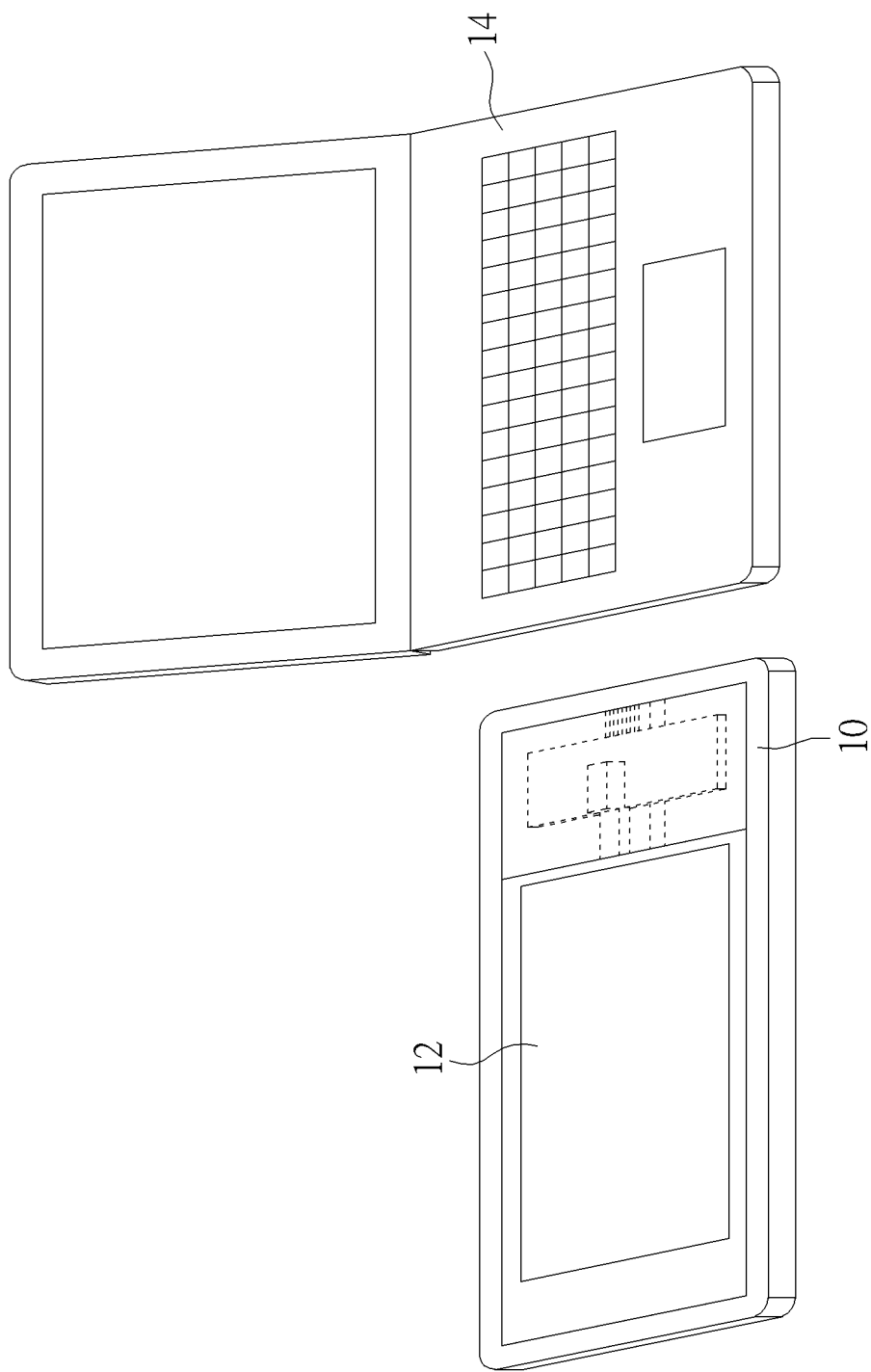
FIG. 1 is a diagram of a portable electronic device and a signal transmission device according to an embodiment of the present invention.

Please refer to FIG. 1. FIG. 1 is a diagram of a portable electronic device and a signal transmission device according to an embodiment of the present invention. The signal transmission device 10 is utilized to electrically connect the first portable electronic device 12 with the second portable electronic device 14 to transmit energy or digital data, as shown in FIG. 1. The first portable electronic device 12 can be the smart phone, the second portable electronic device 14 can be the notebook computer, and the signal transmission device 10 can be the protective shell applied to the smart phone. The first portable electronic device 12 further can be the personal digital assistant (PDA) or the tablet computer, the second portable electronic device 14 further can be the desktop computer, and the signal transmission device 10 is the protective shell with related dimensions. Application of the portable electronic device is not limited to the above-mentioned embodiments, and depends on actual demand.

Figure 2:
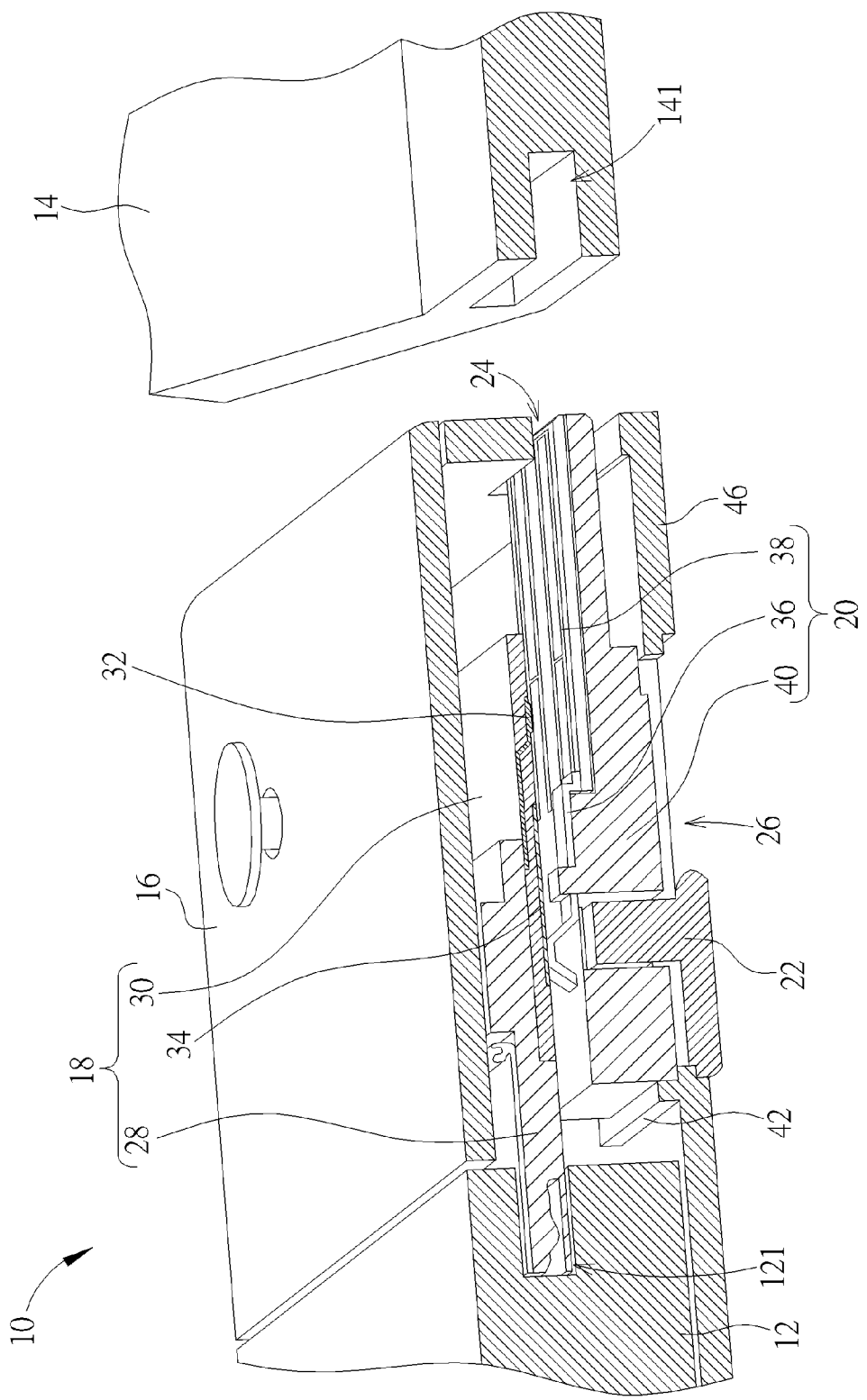
FIG. 2 and FIG. 3 respectively are sectional views of the signal transmission device in different operation modes according to a first embodiment of the present invention.
Figure 3:
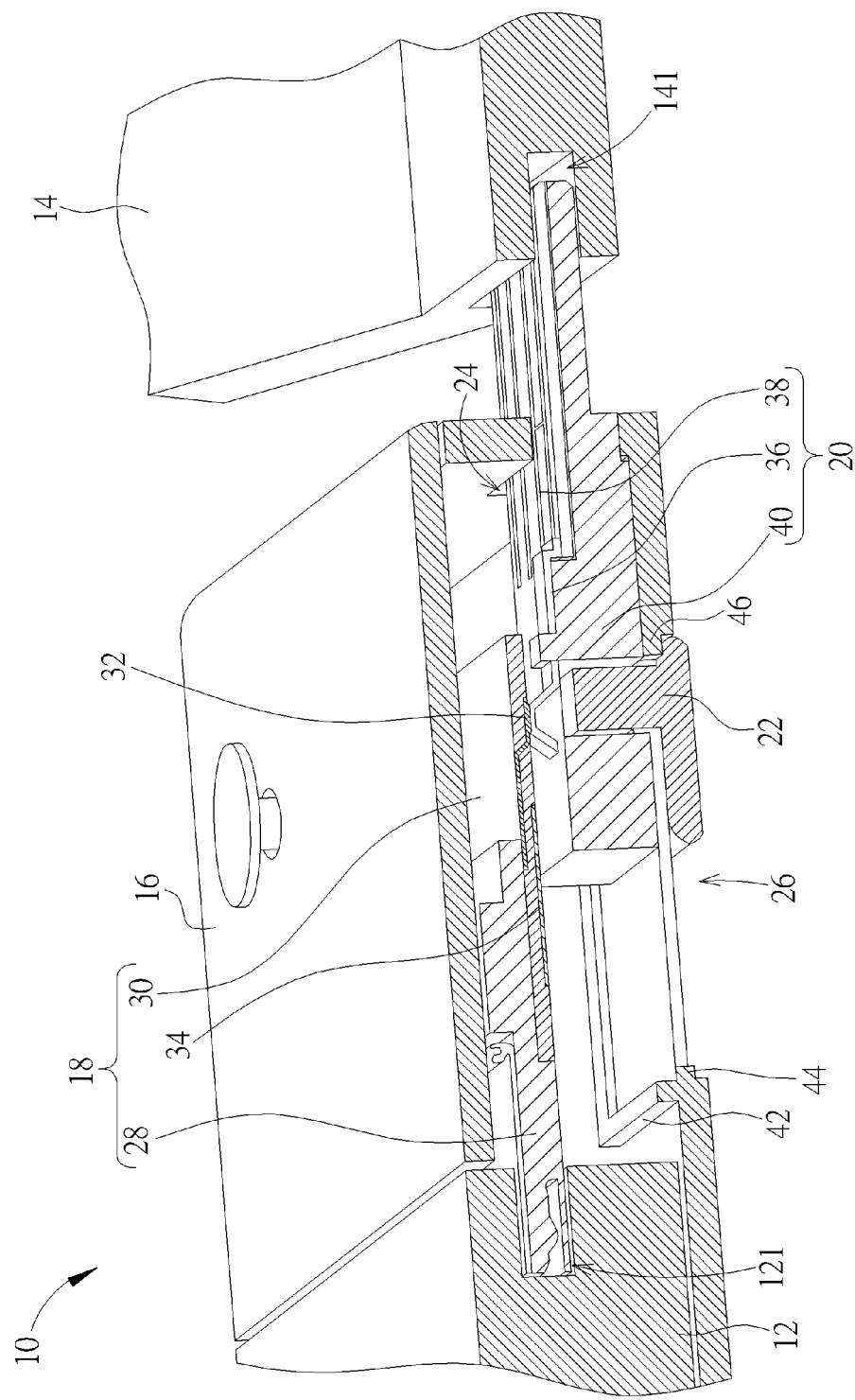
Figure 4:
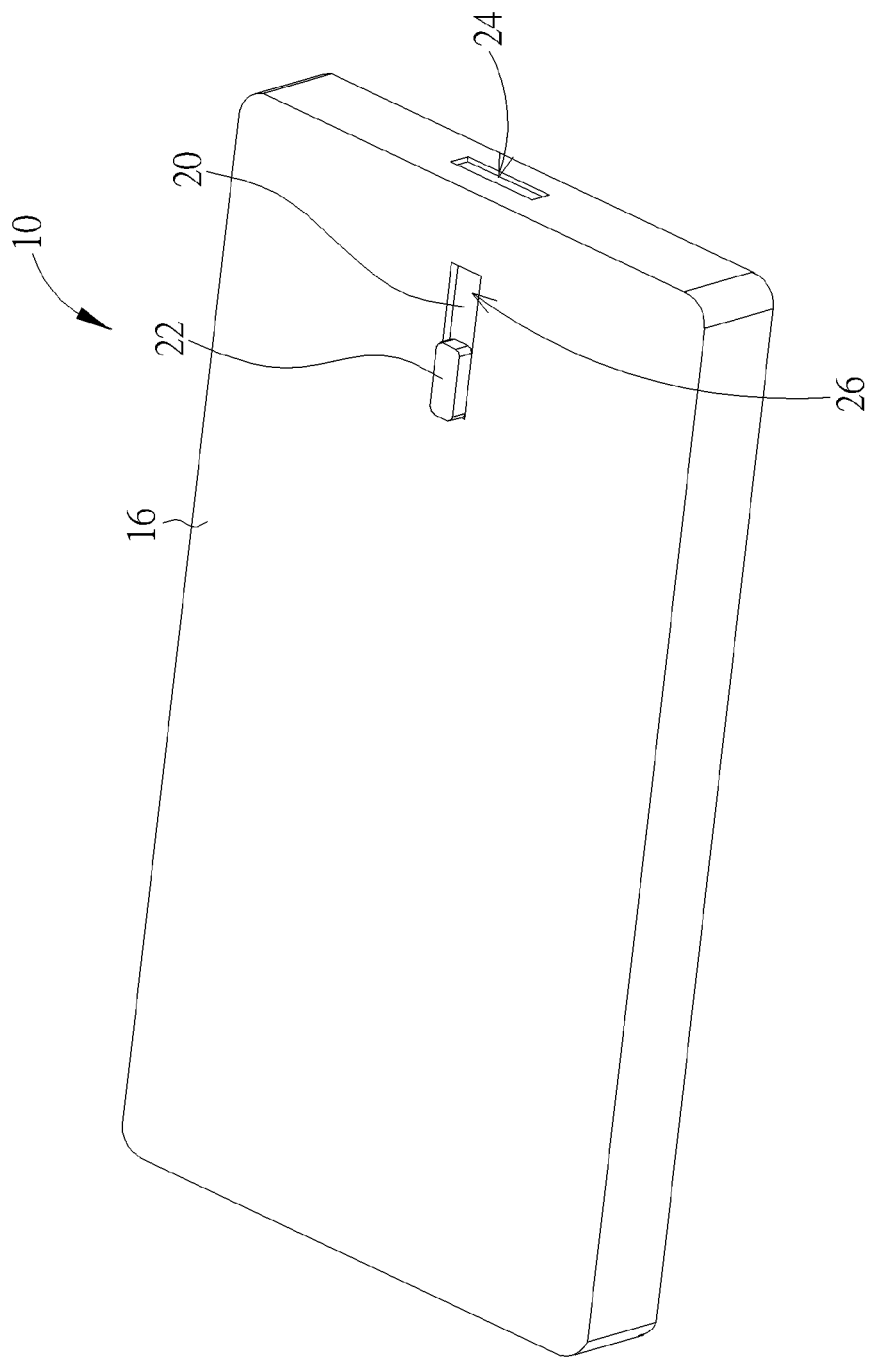
FIG. 4 is a diagram of the signal transmission device shown in FIG. 2.
Figure 5:
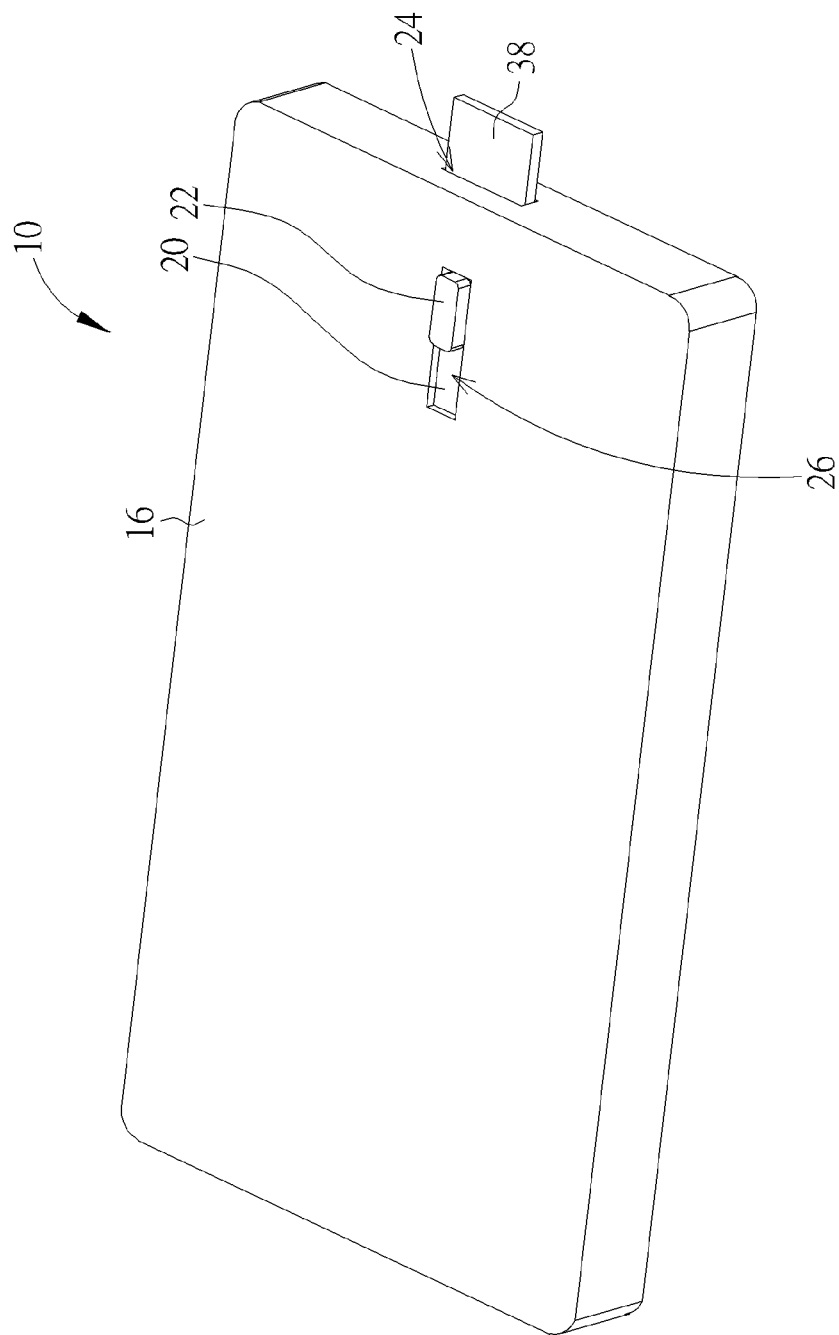
FIG. 5 is a diagram of the signal transmission device shown in FIG. 3.

Please refer to FIG. 2 to FIG. 5. FIG. 2 and FIG. 3 respectively are sectional views of the signal transmission device 10 indifferent operation modes according to a first embodiment of the present invention. FIG. 4 is a diagram of the signal transmission device 10 shown in FIG. 2. FIG. 5 is a diagram of the signal transmission device 10 shown in FIG. 3. The signal transmission device 10 includes a casing 16, a first connector 18, a second connector 20 and a pushing component 22. The casing 16 is utilized to accommodate the first portable electronic device 12 for protection. The casing 16 can includes a hole 24 and a first opening structure 26 respectively disposed on different lateral surfaces of the casing 16.

The first connector 18 is fixed inside the casing 16. The first connector 18 includes a first conductive terminal 28 and a bridging component 30. The first conductive terminal 28 is electrically connected to a socket 121 of the first portable electronic device 12 since the first portable electronic device 12 is assembled with the signal transmission device 10.

The bridging component 30 includes a conductive portion 32 and a non-conductive portion 34. The bridging component 30 can be a printed circuit board, the conductive portion 32 can be a metal wire of the printed circuit board, and the non-conductive portion 32 can be an isolated area on the printed circuit board. An end of the conductive portion 32 is located on an upper surface of the bridging component 30 and electrically connected to the first conductive terminal 28. The other end of the conductive portion 32 is located under a low surface of the bridging component 30 and stretches to a position adjacent to the non-conductive portion 34. The second connector 20 is movably disposed on the casing 16. Movement route of the second connector 20 (such as position variation of the second connector 20 shown between FIG. 2 and FIG. 3) is substantially equal to distance between the non-conductive portion 34 and the other end of the conductive portion 32.

The second connector 20 includes a conductive piece 36, a second conductive terminal 38 and a body 40. The conductive piece 36 and the second conductive terminal 38 are disposed on the body 40. The body 40 is movably disposed on a slide track structure 42 of the casing 16, and the body 40 can utilize the slide track structure 42 to move relative to the casing 16. With movement of the body 40, an end (the upper end/the free end) of the conductive piece 36 can contact the other end of the conductive portion 32 or the non-conductive portion 34 alternatively. The second conductive terminal 38 is electrically connected to the other end (the low end/the fix end) of the conductive piece 36. The second conductive terminal 38 protrudes from the hole 24 since the conductive piece 36 contacts the conductive portion 32 by the movement of the body 40 relative to the casing 16, as shown the position shown in FIG. 3, and the second conductive terminal 38 can be adapted to insert into a socket 141 of the second portable electronic device 14. Further, the second conductive terminal 38 is retracted into the hole 24 since the conductive piece 36 contacts the non-conductive portion 34 by the inverse movement of the body 40 relative to the casing 16, as shown the position shown in FIG. 2, so as to prevent the second conductive terminal 38 from damage by accidental impact.

The pushing component 22 is disposed on the body 40, and part of the pushing component 22 may protrude from the first opening structure 26. The pushing component 22 is slidably disposed inside the first opening structure 26. The pushing component 22 provides a point of application that is pushed to control position variation of the pushing component 22 and to retract the second conductive terminal 38 into the hole 24, as the position shown in FIG. 4. The pushing component 22 further can be pushed to protrude the second conductive terminal 38 from the hole 24, as the position shown in FIG. 5. The casing 16 further includes a first stopper 44 and a second stopper 46 respectively disposed on opposite sides of the first opening structure 26. The pushing component 22 contacts against the first stopper 44 and the second connector 20 is retracted into the hole 24 since the second connector 20 moves to the position shown in FIG. 2. The pushing component 22 contacts against the second stopper 46 and the second connector 20 protrudes from the hole 24 since the second connector 20 moves to the position shown in FIG. 3. The first stopper 44 and the second stopper 46 both provide constraint function for the pushing component 22. The stoppers 44, 46 can be hard units disposed on walls of the first opening structure 26, such as plastic material. The stoppers 44, 46 further can be soft units surrounding the walls of the first opening structure 26. The soft unit may be made of rubber or sponge which has recovery property for buffer protection. Material of the stopper is not limited to the above-mentioned embodiments, and depends on design's demand.

Figure 6:
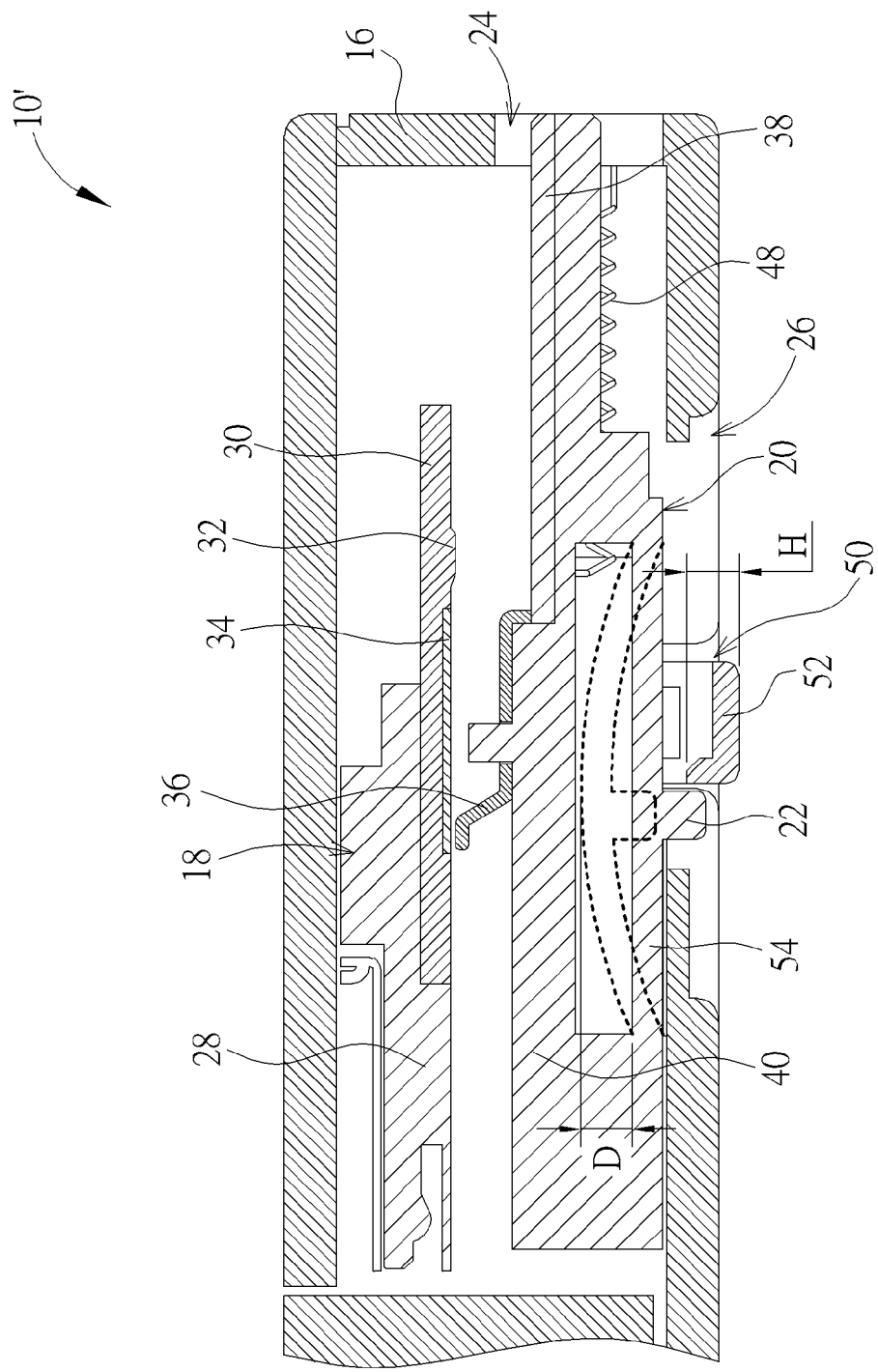
FIG. 6 and FIG. 7 respectively are sectional views of the signal transmission device in different operation modes according to a second embodiment of the present invention.
Figure 7:
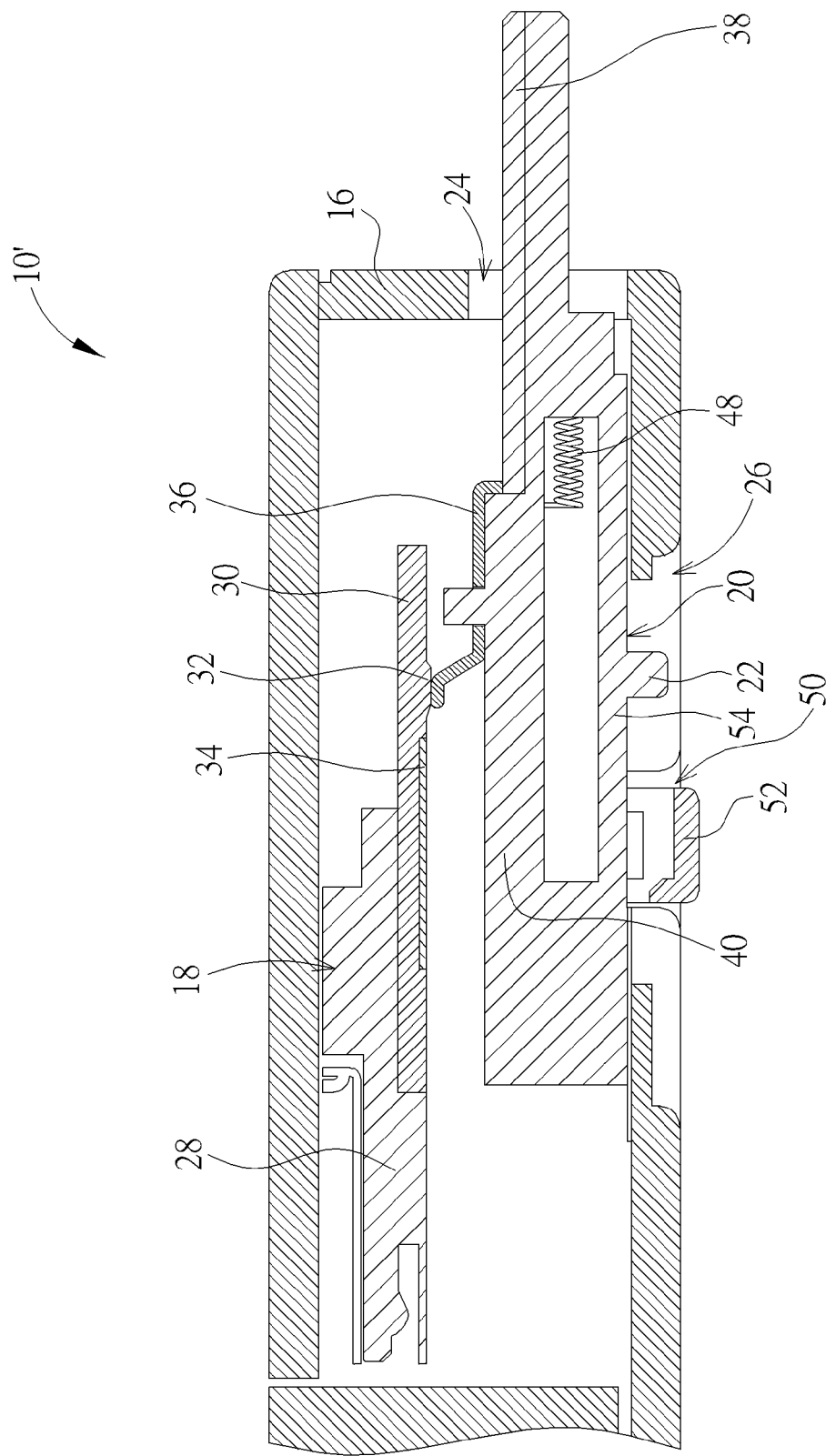
Figure 8:
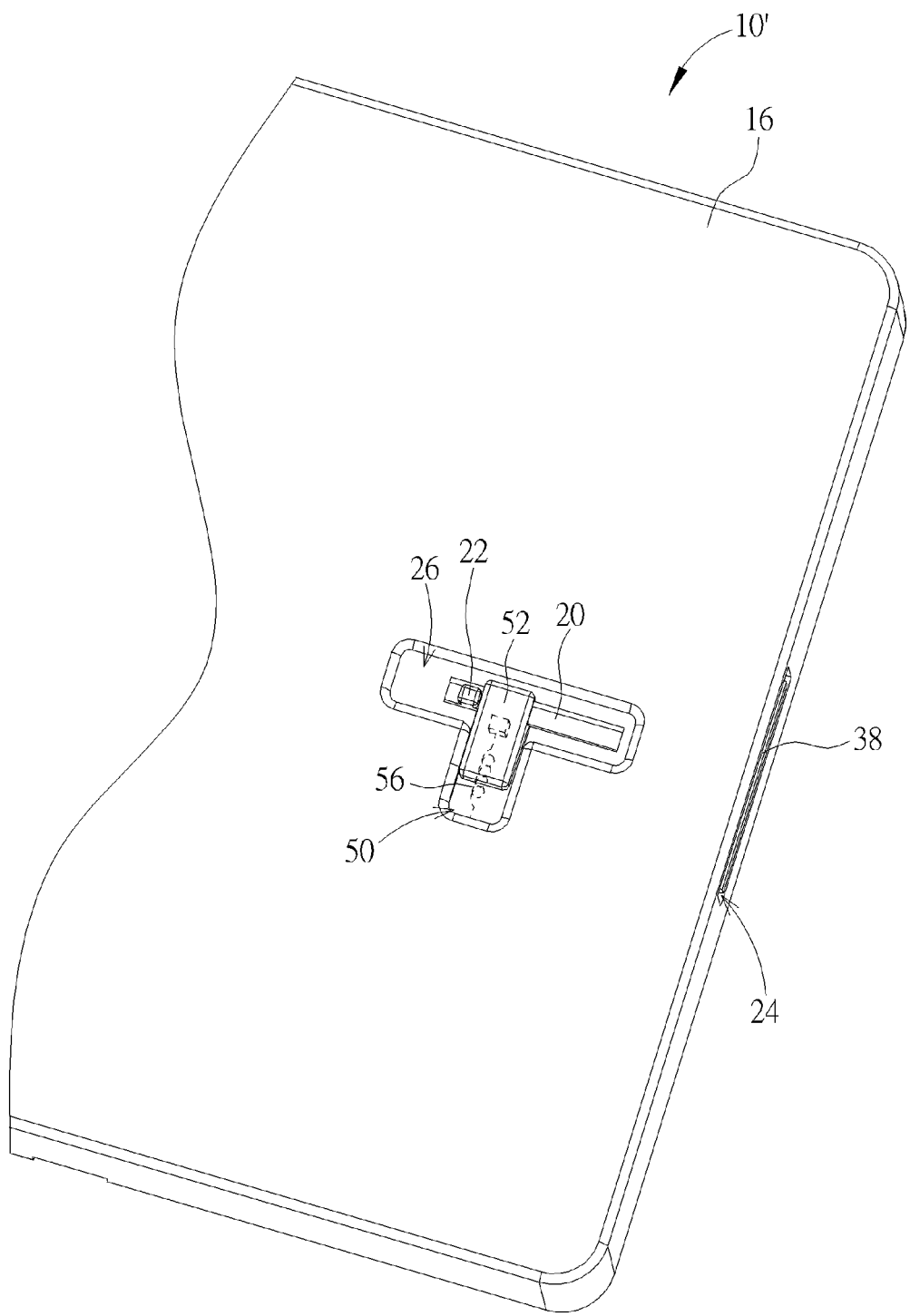
FIG. 8 is the signal transmission device shown in FIG. 6.
Figure 9:
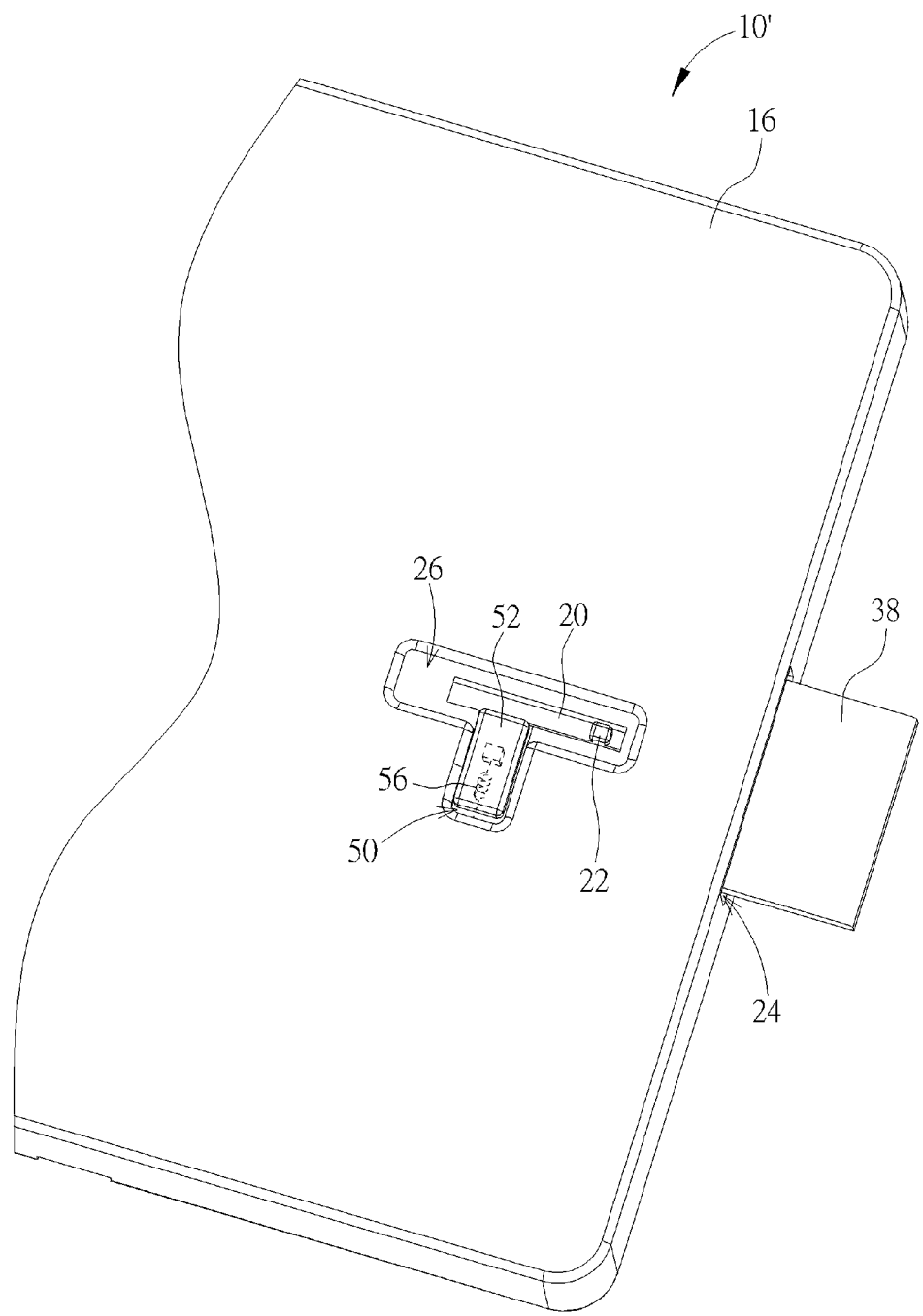
FIG. 9 is the signal transmission device shown in FIG. 7.

Please refer to FIG. 6 to FIG. 9. FIG. 6 and FIG. 7 respectively are sectional views of the signal transmission device 10' indifferent operation modes according to a second embodiment of the present invention. FIG. 8 is the signal transmission device 10' shown in FIG. 6. FIG. 9 is the signal transmission device 10' shown in FIG. 7. In the second embodiment, elements having the same numeral as ones of the first embodiment have the same structures and functions, and a detailed description is omitted herein for simplicity. The signal transmission device 10' further includes a resilient component 48. Two ends of the resilient component 48 are respectively connected to the casing 16 and the body 40. Resilient recovering force of the resilient component 48 moves the second connector 20 from the position shown in FIG. 6 to the position shown in FIG. 7. The casing 16 further includes a second opening structure 50 connected to the first opening structure 26. The signal transmission device 10' further includes a constraining component 52 slidably disposed inside the first opening structure 26 and the second opening structure 50. The constraining component 52 contacts against the pushing component 22 to constrain the resilient recovering force of the resilient component 48, and the second conductive terminal 38 can stably stay inside the hole 24, such as the position shown in FIG. 6. The body 40 further includes a deforming portion 54 whereon the pushing component 22 is disposed. The deforming portion 54 can be a cantilever beam or any other similar structure.

As shown in FIG. 6 and FIG. 8, the second connector 20 is located inside the casing 16. The second conductive terminal 38 does not protrude from the hole 24, the conductive piece 36 contacts the non-conductive portion 34, the constraining component 52 slides into the first opening structure 26, the deforming portion 54 have no structural deformation to contact the pushing component 22 against the constraining component 52, which means movement of the pushing component 22 along the first opening structure 26 is constrained by the constraining component 52. Meanwhile, the signal transmission device 10' is only electrically connected to the first portable electronic device 12. As the pushing component 22 is pressed by an external force, the deforming portion 54 is structurally deformed. Because deformation D (such as dotted lines shown in FIG. 6) of the deforming portion 54 is greater than a structural height H of the constraining component 52, position variation of the pushing component 22 is substantially greater than the structural height H. The pushing component 22 is not constrained by the constraining component 52, and the resilient recovering force of the resilient component 48 can move the second connector 20 relative to the casing 16. As shown in FIG. 7 and FIG. 9, the resilient component 48 moves the second connector 20, the conductive piece 36 contacts the conductive portion 32, part (the second conductive terminal 38) of the second connector 20 protrudes from the hole 24. In the meantime, the signal transmission device 10' is electrically connected to the first portable electronic device 12 and the second portable electronic device 14, energy or digital data can be transmitted between the portable electronic devices by the signal transmission device 10'.

For retracting the second conductive terminal 38 into the casing 16, the constraining component 52 is moved from the first opening structure 26 to the second opening structure 50, such as the position shown in FIG. 9, and the pushing component 22 can be moved from an end of the first opening structure 26 to the other end of the first opening structure 26. Then, the constraining component 52 moves back into the first opening structure 26, such as the position shown in FIG. 8, and the constraining component 52 contacts against the pushing component 22 to constrain the movement of the second connector 20 relative to the casing 16. The signal transmission device 10' further can include a recovering component 56 in order to replace manual actuation of the constraining component 52. Two ends of the recovering component 56 are respectively connected to the casing 16 and the constraining component 52. Resilient recovering force of the recovering component 56 automatically moves the constraining component 52 from the second opening structure 50 to the first opening structure 26.

Figure 10:
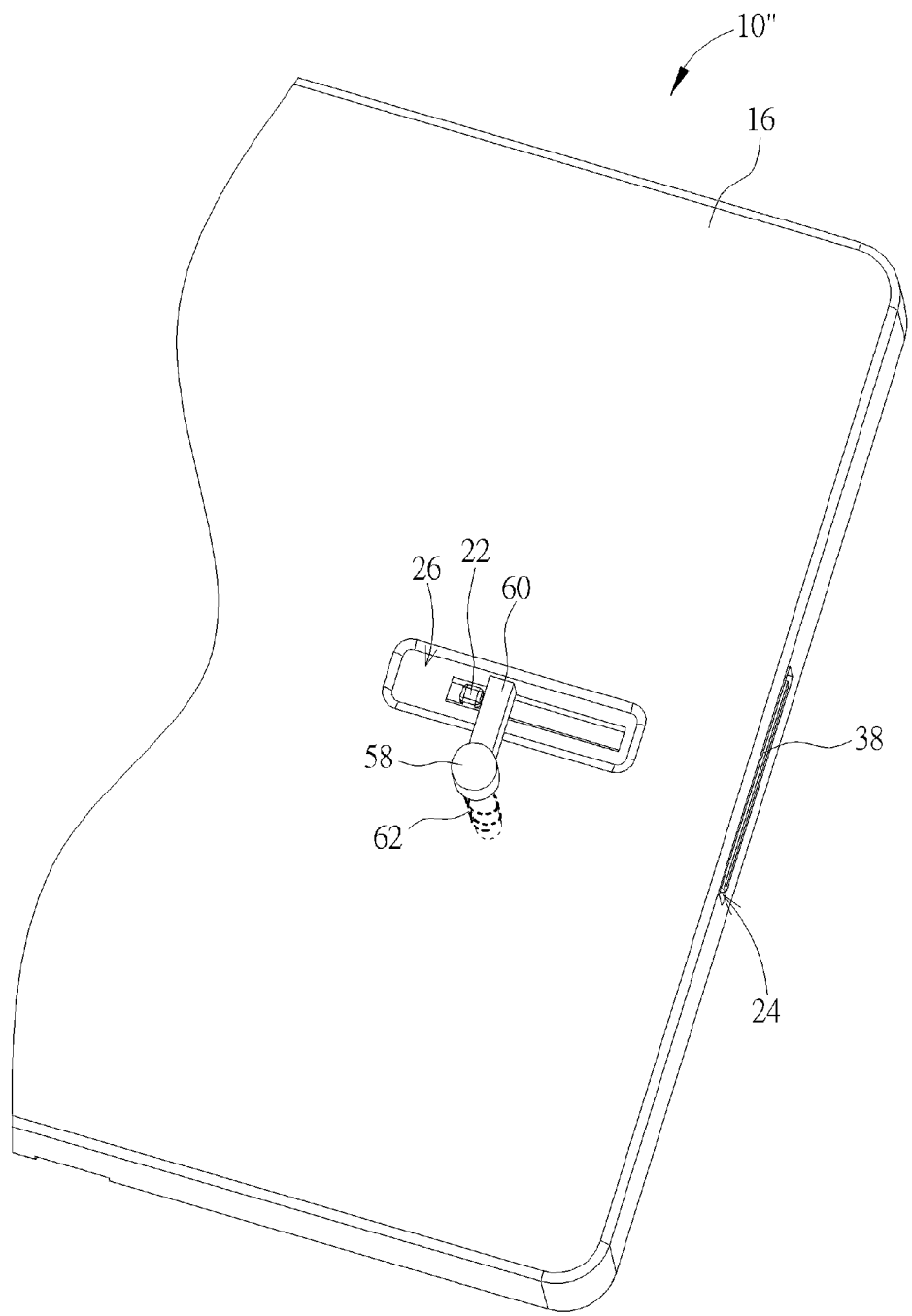
FIG. 10 and FIG. 11 respectively are diagrams of the signal transmission device in different operation modes according to a third embodiment of the present invention.
Figure 11:
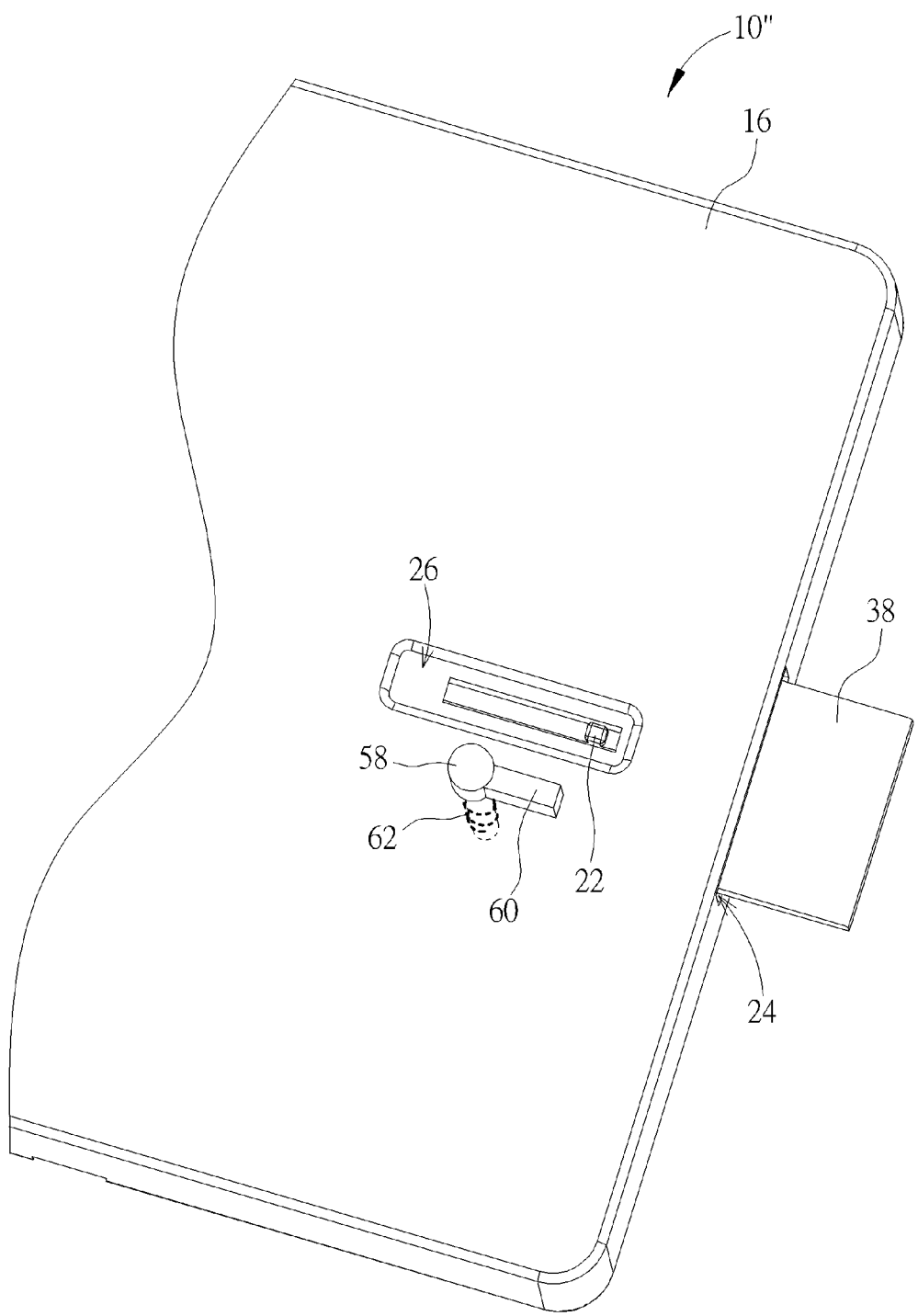

Please refer to FIG. 10 and FIG. 11. FIG. 10 and FIG. 11 respectively are diagrams of the signal transmission device 10" in different operation modes according to a third embodiment of the present invention. In the third embodiment, elements having the same numeral as ones of the above-mentioned embodiment have the same structures and functions, and a detailed description is omitted herein for simplicity. The signal transmission device 10" further includes a rotating component 58 rotatably disposed by the first opening structure 26. The rotating component 58 can be rotated relative to the casing 16, and a protruding portion 60 of the rotating component 58 moves into the first opening structure 26 to contact against the pushing component 22, as shown in FIG. 10. The protruding portion 60 further can be moved out of the first opening structure 26, the pushing component 22 can be freely moved along the first opening structure 26 without constraint, and the second conductive terminal 38 of the second connector 20 can protrude from the hole 24, as shown in FIG. 11. The second conductive terminal 38 is adapted to inset into the socket 141 of the second portable electronic device 14. Besides, the signal transmission device 10" further can include a torsional component 62 disposed between the rotating component 58 and the casing 16. The torsional component 62 provides torque to automatically recover the rotating component 58 from the position shown in FIG. 11 to the position shown in FIG. 10.

Figure 12:
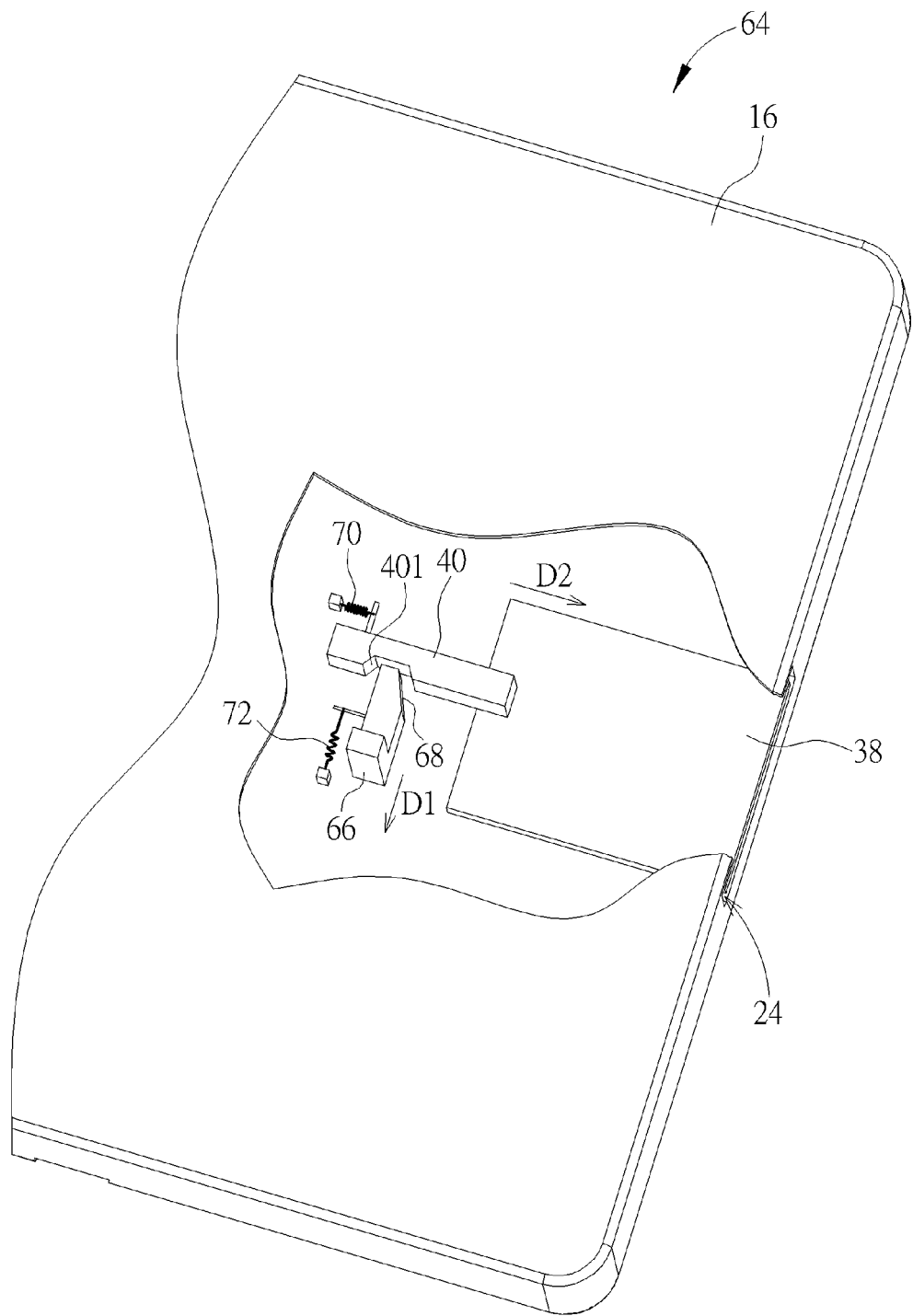
FIG. 12 and FIG. 13 respectively are diagrams of the signal transmission device in different operation modes according to a fourth embodiment of the present invention.
Figure 13:
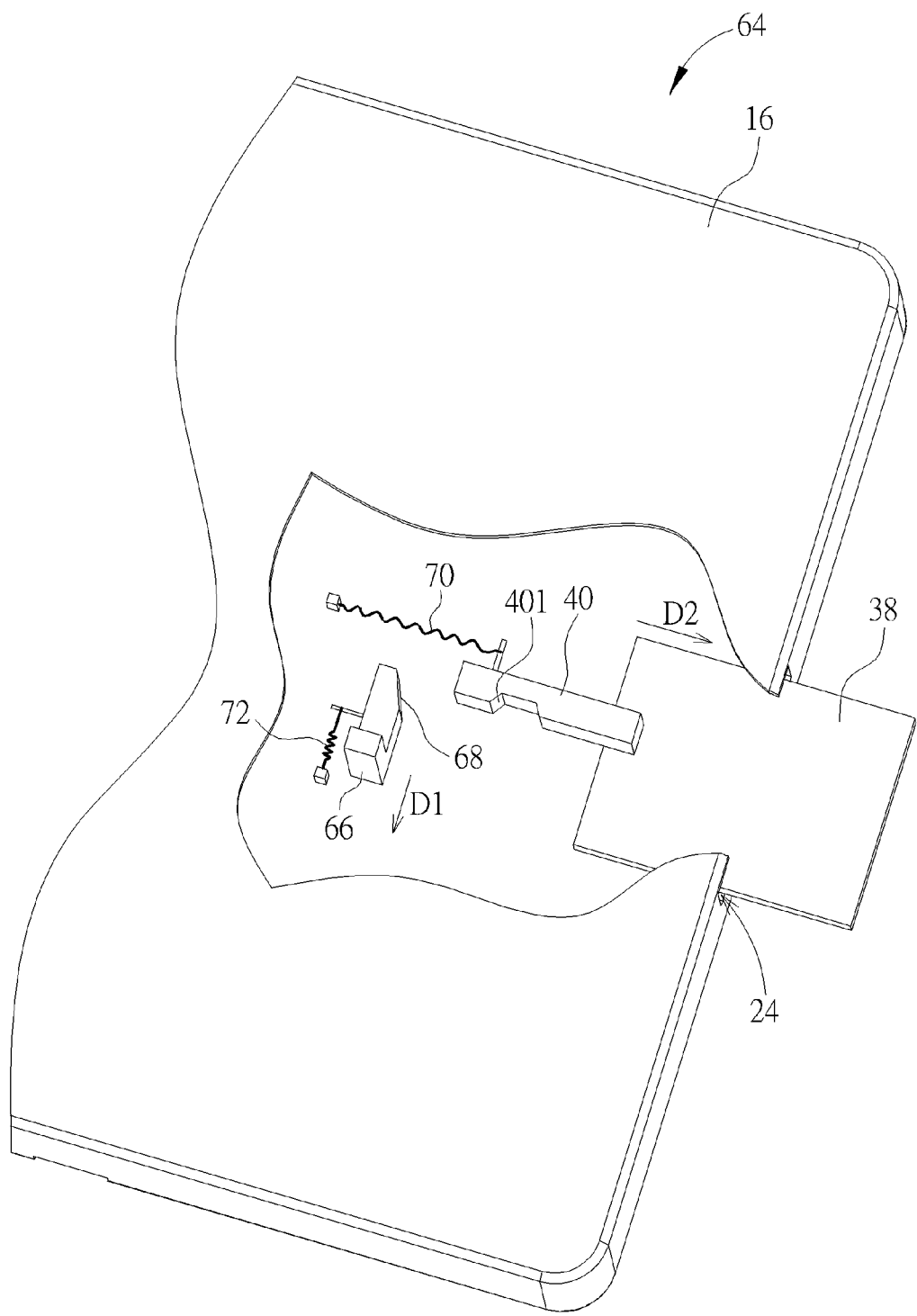

Please refer to FIG. 12 and FIG. 13. FIG. 12 and FIG. 13 respectively are diagrams of the signal transmission device 64 in different operation modes according to a fourth embodiment of the present invention. In the fourth embodiment, elements having the same numeral as ones of the above-mentioned embodiment have the same structures and functions, and a detailed description is omitted herein for simplicity. The signal transmission device 64 further includes an actuating component 66 slidably disposed inside the casing 16. A front end of the actuating component 66 can insert into or exit from a sunken structure 401 of the body 40 by slide of the actuating component 66 relative to the casing 16. An inclined guiding structure 68 may be disposed on the front end of the actuating component 66. The signal transmission device 64 further includes a first elastic component 70 and a second elastic component 72. Two ends of the first elastic component 70 are respectively connected to the body 40 and the casing 16. Two ends of the second elastic component 72 are respectively connected to the actuating component 66 and the casing 16.

As shown in FIG. 12, the front end of the actuating component 66 is engaged with the sunken structure 401, and the second conductive terminal 38 is located inside the hole 24. The front end of the actuating component 66 can be exited from the sunken structure 401 since the actuating component 66 slides at the first direction D1. Resilient recovering force of the first elastic component 70 drives the second conductive terminal 38 to pierce through the hole 24 at the second direction D2. For retraction of the second conductive terminal 38 into the casing 16, the body 40 is pushed at a direction opposite to the second direction D2, the actuating component 66 is moved at the first direction D1 by relative movement of the inclined guiding structure 68 and the body 40, and structural interference between the actuating component 66 and the body 40 can be removed. When the body 40 moves back to an initial position shown in FIG. 12, resilient recovering force of the second elastic component 72 inserts the actuating component 66 into the sunken structure 401, and the second conductive terminal 38 can stably stay inside the casing 16, as the position shown in FIG. 13.

The present invention provides the protective shell with the signal transmission device, which is applied to the mobile phone or the tablet computer. The first connector of the signal transmission device is electrically connected to the socket of the first portable electronic device since the first portable electronic device is assembled with the signal transmission device. The second connector of the signal transmission device can move relative to the casing. The second conductive terminal of the second connector is hidden inside the casing since the second connector is retracted into the casing, and the signal transmission device has preferred aesthetic. The second conductive terminal can be electrically connected to the first conductive terminal via the conductive piece and the conductive portion of the bridging component since the second conductive terminal protrudes from the hole on the casing. Therefore, connection between the first portable electronic device and the second portable electronic device is established via the signal transmission device for transmission of the energy or the digital data by inserting the second conductive terminal into the socket of the second portable electronic device.

Position variation of the second connector is driven by the pushing component. In the first embodiment, the pushing component is manually moved inside the first opening structure. In the second embodiment, the pushing component is moved inside the first opening structure by the resilient component. The signal transmission device utilizes the constraining component, which is movably disposed on the first opening structure, to contact against the pushing component and to remove the foresaid structural interference, and the signal transmission device can be conveniently switched between the different operation modes. The third embodiment utilizes the rotating component to replace the constraining component illustrated in the second embodiment. Position of the protruding portion of the rotating component is varied to contact against the pushing component and to remove the foresaid structural interference. The fourth embodiment disposes the first elastic component and the second elastic component respectively on the body and the actuating component. The actuating component can insert into or exit from the sunken structure of the body in a removable manner, so that the second connector has functions of automatic ejection and automatic constraint in retraction. Applications of constraint/remove function applied to the pushing component are not limited to the above-mentioned embodiments, and depend on design's demand.

Comparing to the prior art, the present invention assembles the energy charge/data transmission mechanism with the protective shell, and the protective shell can be detachably disposed on the portable electronic device for operational convenience. The signal transmission device of the present invention has advantages of simple structure and easy operation, operation modes of the signal transmission device can be rapidly switched by position variation of the pushing component, and the signal transmission device is suitable of any kinds of portable electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal transmission device capable of electrically connecting a first portable electronic device to a second portable electronic device, the signal transmission device comprising:
    a casing whereinside the first portable electronic device is accommodated, a hole being formed on the casing;
    a first connector disposed inside the casing, the first connector comprising:
        a first conductive terminal electrically connected to a socket of the first portable electronic device; and
        a bridging component having a conductive portion and a non-conductive portion, the bridging component being electrically connected to the first conductive terminal via the conductive portion;
    a second connector movably disposed on the casing, the second connector comprising:
        a conductive piece, an end of the conductive piece being switched to contact the conductive portion and to contact the non-conductive portion according to movement of the second connector; and
        a second conductive terminal electrically connected to the other end of the conductive piece, the second conductive terminal being adapted to protrude from the hole since the conductive piece contacts the conductive portion, so as to insert the second conductive terminal into a socket of the second portable electronic device.

2. The signal transmission device of claim 1, wherein the second conductive terminal is located inside the hole since the conductive piece contacts the non-conductive portion.

3. The signal transmission device of claim 1, wherein the casing comprises a slide track structure, the second connector further comprises a body, the conductive piece and the second conductive terminal are disposed on the body, the body utilizes the slide track structure to move relative to the casing.

4. The signal transmission device of claim 3, wherein the casing further comprises a first opening structure, the signal transmission device further comprises a pushing component disposed on the body and slidably located inside the first opening structure.

5. The signal transmission device of claim 4, wherein the casing further comprises a first stopper and a second stopper respectively disposed on opposite sides of the first opening structure.

6. The signal transmission device of claim 5, wherein the second conductive terminal is retracted into the hole since the pushing component moves to the first stopper, and the second conductive terminal protrudes from the hole since the pushing component moves to the second stopper.

7. The signal transmission device of claim 3, further comprising:
    a resilient component, two ends of the resilient component being respectively connected to the casing and the body.

8. The signal transmission device of claim 4, wherein the casing further comprises a second opening structure connected to the first opening structure, the body comprises a deforming portion whereon the pushing component is disposed, the signal transmission device further comprises a constraining component slidably disposed between the first opening structure and the second opening structure.

9. The signal transmission device of claim 8, wherein the constraining component is located on the first opening structure to contact against the pushing component.

10. The signal transmission device of claim 8, wherein the constraining component is located on the second opening structure, the pushing component is adapted to move from an end of the first opening structure to the other end of the first opening structure.

11. The signal transmission device of claim 8, wherein position variation of the pushing component is substantially greater than a structural height of the constraining component since the deforming portion is deformed.

12. The signal transmission device of claim 8, further comprising:
   a recovering component, two ends of the recovering component being respectively connected to the casing and the constraining component.

13. The signal transmission device of claim 4, further comprising:
   a rotating component rotatably disposed by the first opening structure, a protruding portion of the rotating component being adapted to move into the first opening structure to contact against the pushing component.

14. The signal transmission device of claim 13, wherein the rotating component rotates relative to the casing to move the protruding portion into or out of the first opening structure.

15. The signal transmission device of claim 13, further comprising:
   a torsional component disposed between the rotating component and the casing.

16. The signal transmission device of claim 3, further comprising:
   an actuating component slidably disposed inside the casing, the actuating component being adapted to insert into a sunken structure of the body to constrain movement of the body relative to the casing.

17. The signal transmission device of claim 16, further comprising:
   an inclined guiding structure disposed on an end of the actuating component and slidably contacting the body to move the actuating component relative to the casing.

18. The signal transmission device of claim 16, further comprising:
   a first elastic component, two ends of the first elastic component being respectively connected to the body and the casing; and
   a second elastic component, two ends of the second elastic component being respectively connected to the actuating component and the casing.

* * * * *